Sept. 17, 1957  A. J. RHODES  2,806,384
HAND BRAKE PULL ROD ASSEMBLY
Filed April 12, 1954  4 Sheets-Sheet 1
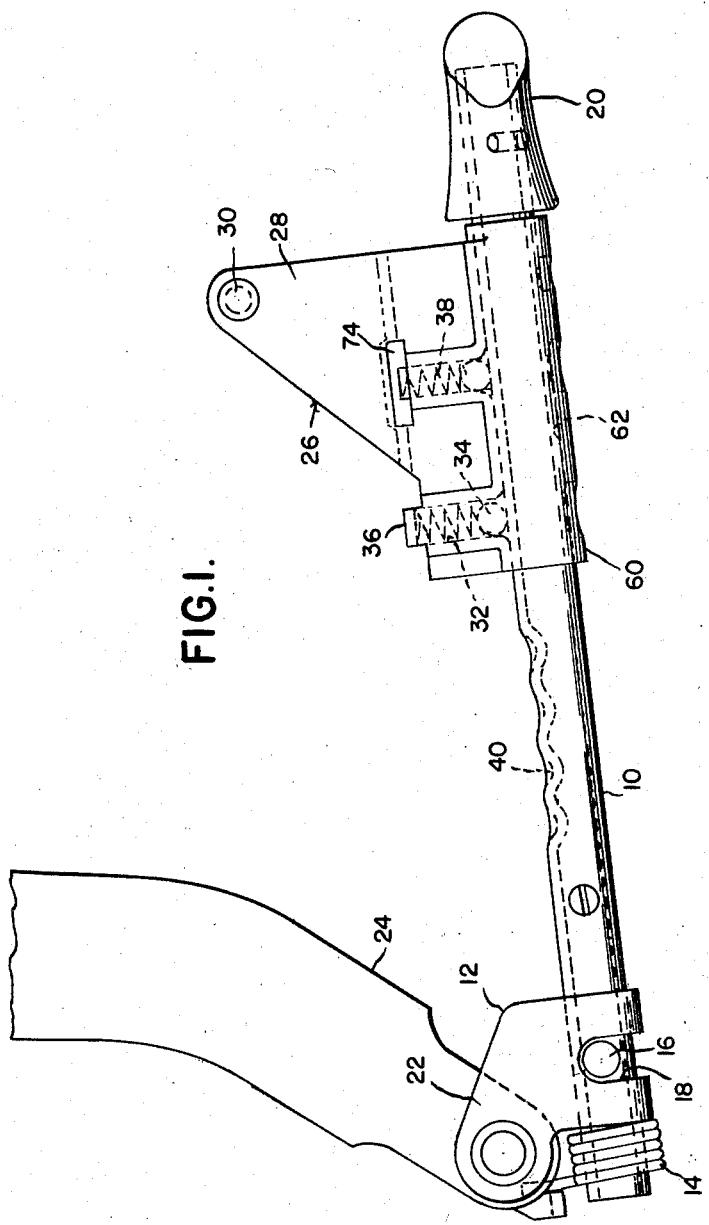
INVENTOR.
ALBERT J. RHODES
BY
Whittemore, Hulbert & Belknap
ATTORNEYS

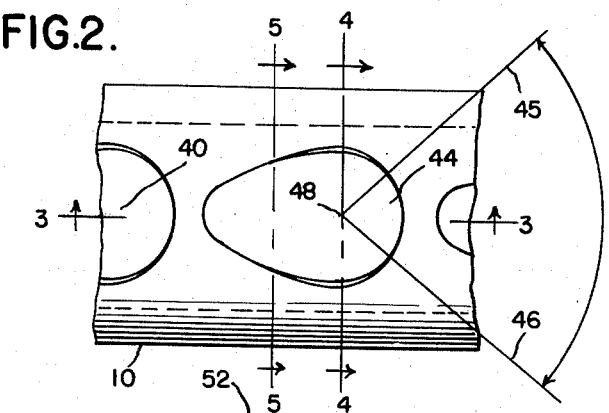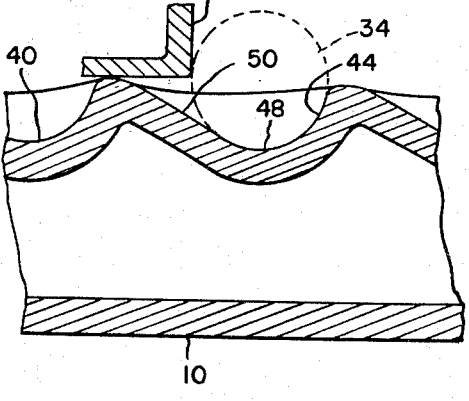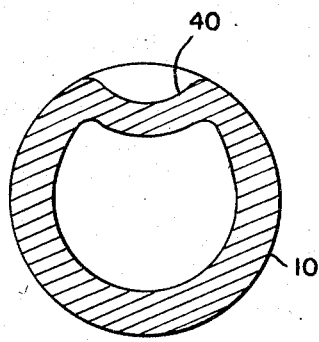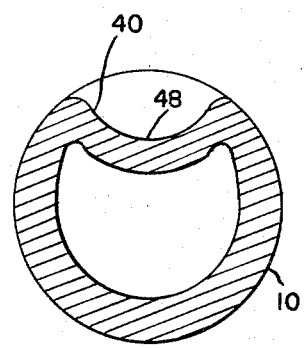

Sept. 17, 1957  A. J. RHODES  2,806,384
HAND BRAKE PULL ROD ASSEMBLY
Filed April 12, 1954  4 Sheets-Sheet 3
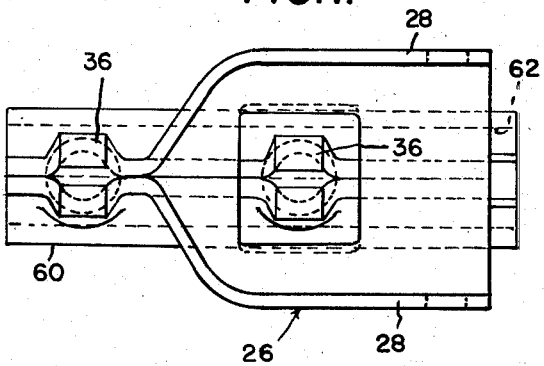
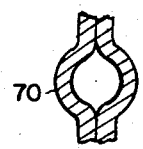
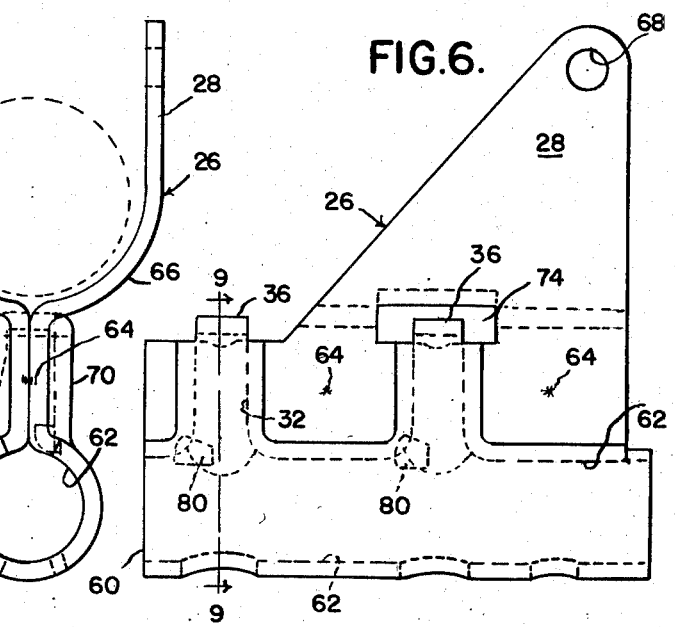
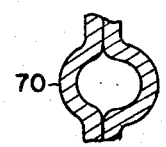
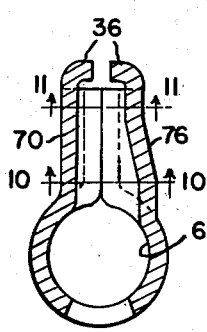
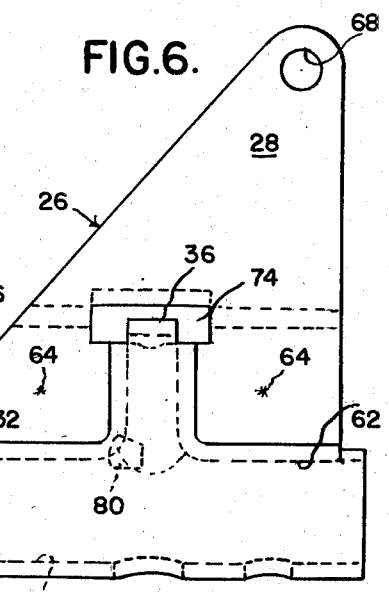
INVENTOR.
ALBERT J. RHODES
BY
Whittemore, Hulbert + Belknap
ATTORNEYS

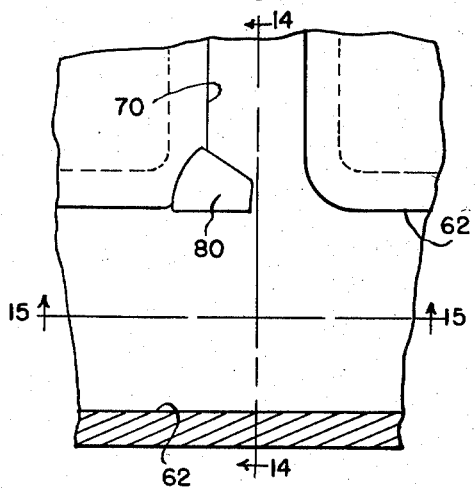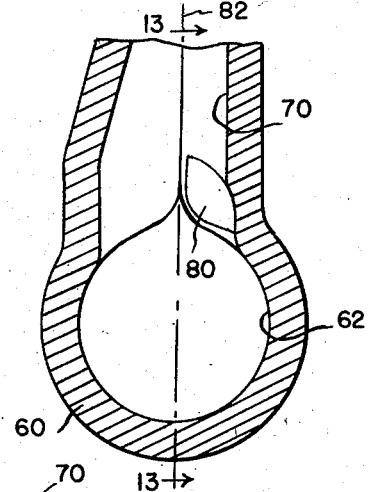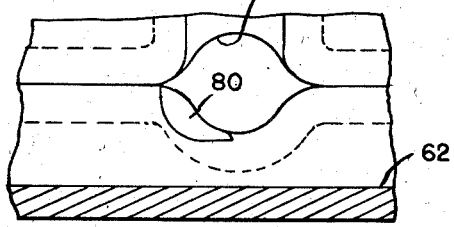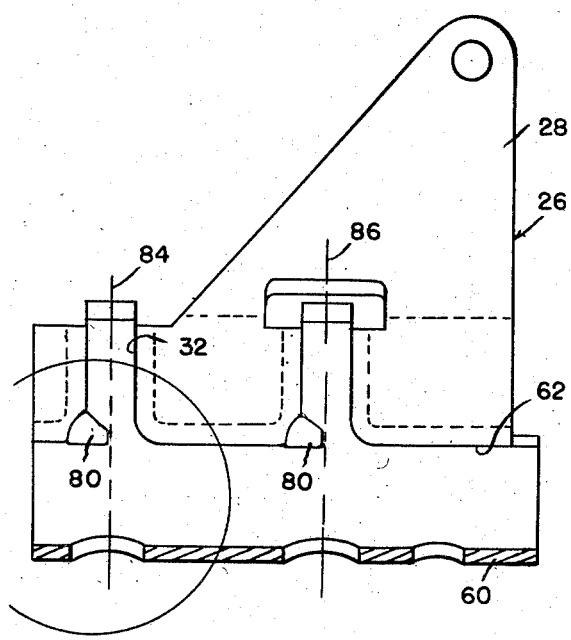

United States Patent Office 2,806,384
Patented Sept. 17, 1957

2,806,384
HAND BRAKE PULL ROD ASSEMBLY

Albert J. Rhodes, Lake Orion, Mich., assignor to American Forging & Socket Company, Pontiac, Mich., a corporation of Michigan Application April 12, 1954, Serial No. 422,408

14 Claims. (Cl. 74—503)

The present invention relates to a hand brake pull rod assembly.

It is an object of the present invention to provide a hand brake pull rod assembly comprising a bracket having a generally cylindrical passage therethrough in which is received a brake pull rod, the pull rod having ball receiving indents therein, the bracket having laterally extending chambers, balls in the chambers, springs in the chambers urging the balls into engagement with the pull rod, and laterally extending recesses formed in the chambers substantially at the juncture between said chambers and said passage adapted to engage a ball and to prevent inadvertent displacement of the ball from a detent in the pull rod.

It is a further object of the present invention to provide a brake pull rod supporting bracket formed of sheet metal shaped to provide a rod receiving passage and laterally extending ball receiving chambers intersecting the passage, the interior surface of the bracket substantially at the juncture of the passage and chamber having a laterally extending recess providing a shoulder surface engageable with the ball and effective to prevent accidental displacement of a ball outwardly of the chamber.

More specifically, it is an object of the present invention to provide a recess as described in the preceding paragraph which is located in the chamber at the side thereof toward which the brake rod is urged in use and at the side thereof toward which the adjacent surface of a brake rod received in the passage tends to turn.

Other objects and features of the invention will become apparent as the description proceeds, especially when taken in conjunction with the accompanying drawings, wherein:

Figure 1 is a side elevation of the pull rod assembly.

Figure 2 is an enlarged fragmentary plan view of a portion of the pull rod showing one of the ball receiving detents therein.

Figure 3 is a section on the line 3—3, Figure 2.

Figure 4 is a section on the line 4—4, Figure 2.

Figure 5 is a section on the line 5—5, Figure 2.

Figure 6 is a side elevation of the improved bracket construction.

Figure 7 is a plan view of the bracket shown in Figure 6.

Figure 8 is an end view of the bracket shown in Figure 6 looking at the right end of Figure 6.

Figure 9 is a sectional view on the line 9—9, Figure 6.

Figure 10 is a sectional view on the line 10—10, Figure 9.

Figure 11 is a sectional view on the line 11—11, Figure 9.

Figure 12 is a vertical section through the bracket.

Figure 13 is an enlarged sectional view of the portion of the bracket enclosed by the circle in Figure 12, and representing a section on the line 13—13, Figure 14.

Figure 14 is an enlarged sectional view on the line 14—14, Figure 13.

Figure 15 is an enlarged sectional view on the line 15—15, Figure 13.

Referring now to the drawings, the mechanism is illustrated as comprising a part of a hand brake mechanism. The pull rod 10 has a swivel bracket 12 connected to one end and associated with the swivel bracket 12 is a coil spring 14 tending to rotate the pull rod 10. Extending laterally from the pull rod 10 is a stop element 16 received in a slot 18 in the bracket for the purpose of limiting rotation of the pull rod 10 in one direction. At its opposite end the pull rod has rigidly connected thereto an operating handle 20 by means of which the pull rod may be pulled to the right, as seen in Figure 1, or rotated counterclockwise.

The swivel bracket 12 includes apertured ears 22 by means of which it is connected to a lever 24 forming a portion of the brake actuating system. When the brake is applied forces are developed tending to move the lower end of the lever 24 to the left, so that the brake is applied by a pull on the handle 20.

A pawl bracket indicated generally at 26, is provided, the bracket having upwardly extending arms 28 for receiving a pivot pin 30 which provides a pivot mounting for the bracket 26. As subsequently described in more detail, the bracket 26 is formed to provide upwardly extending ball receiving chambers 32 having balls 34 located therein. The upper ends of the chambers 32 are closed as by bent over tabs indicated at 36, and compression springs 38 are provided urging the balls 34 downwardly into engagement with the pull rod 10.

The pull rod 10 is herein illustrated as formed of tubular stock having a plurality of ball receiving indents or seats 40 therein, the shape of which will subsequently be described in detail.

Referring now to Figures 2–5 there is illustrated the structure of the pull rod 10. The pull rod is formed of tubular stock and in a specific example, excellent results have been obtained using a ½ inch tube formed of 13 gauge steel. Longitudinally of the rod are provided a plurality of axially aligned ball receiving indentations or seats indicated generally at 40. The ball seats are of course dimensioned to cooperate with a specific ball detent such for example as that illustrated at 34. The indentations or ball seats 40 are elongated in a direction parallel to the axis of the pull rod 10 and have a specific configuration designed to cooperate with the ball detents. At the end of the indentations 40 adjacent to the handle the inner surface of the indentations, as indicated at 44 in Figure 2 (which lies between the construction lines 45 and 46) is spherically formed and is of substantially the same radius as the radius of the ball detent. The indentation has its greatest depth at a point 48, and as illustrated in Figure 4, a sectional view taken through the point 48, the indentation has a transverse circular cross-section, the radius of curvature thereof however being substantially greater than the radius of curvature of the ball or of the surface portion 44 of the indentation. In a specific case, using a ball having a diameter of .250 inch, the radius of curvature extending transversely across the indentation and passing through its deepest point 48 has a radius of curvature of 5/32 inch. Successive cross-sections taken to the left of section 4—4 in Figure 2 are of gradually and preferably uniformly decreasing depth so that the bottom of the indentation from its deepest point 48 to the left hand end thereof, as seen in Figure 3, is substantially the straight line 50.

While in the illustrated embodiment of the invention the ball receiving indentations are shown as having a cross-section transversely of the rod at the point of deepest depth the radius of curvature of which is in excess of the radius of curvature of the ball, this is not an essential requirement. It will be apparent that if the cross-section transversely of the rod at the deepest point of the indentation has a radius of curvature equal to that of the ball, rotation of the rod about its axis will still operate to cam the ball outwardly of the indentation since the sides of the indentation intersect the outer surface of the rod at points substantially below the horizontal plane tangent to the top of the rod. In like manner, the successive transverse rod sections taken to the left of the section 4—4 in Figure 2, may have a radius of curvature equal to that of the ball.

In assembly the balls 34 are received in the chambers or pockets 32 and are pressed against the adjacent surfaces of the rod 10 by the compression springs 38.

As a result of the foregoing construction it will be observed that if the rod is pulled to the right as seen in Figure 1, the gradually inclined surfaces of the indentations operate as a camming surface to force the balls 34 outwardly against the action of the compression springs 38. However, movement of the rod to the left is effectively prevented by the engagement between the spherical portion 44 of the indentation, the ball 34, and the mating surface 52 of the ball receiving pocket, as seen in Figure 3. In this case it will be observed in Figure 3 that the maximum depth of the indentation 40 is approximately equal to the radius of the ball whereby the spherical surface 44 cannot operate to cam the ball outwardly of the indentation.

However, it will be recalled that the pull rod 10 in addition to being longitudinally movable is also rotatable. The transverse cross-section of the elongated indentation is so shaped that rotation of the rod 10 is also effective to cam the ball out of its seat. Thus, the pull rod 10 may be moved from its idle position illustrated in Figure 1, to the brake applying position by pulling the handle 20 without rotating the rod. The successive indentations 40 merely cam the balls 34 outwardly and when the rod has been moved to the desired extent it is released and one of the balls 34 drops into the nearest indentation 40 thereby locking the rod in extended or operative position. To release the brake, the handle 20 is rotated, thereby rotating the rod and camming the ball 34 out of its indentation or ball seat, after which the rod is freely movable to the left as seen in Figure 1, so long as the indentations 40 are kept out of alignment with the balls 34.

The present invention is primarily concerned with a specific arrangement of bracket which provides means for in effect locking a ball in a ball receiving seat when the brake is applied so as to prevent accidental release of the brake as might otherwise occur if the handle 20 were accidentally bumped with the knee or hand. The construction of this bracket is best illustrated in Figures 6–15 to which reference is now made.

The bracket 26 preferably is formed of sheet metal which in effect is doubled to provide a generally tubular portion 60 having a generally cylindrical rod receiving passage 62 formed therein. The material of the bracket is abutted against itself and welded together as indicated at 64, and the upper edge portions are flared outwardly as indicated at 66 and terminate in the upwardly extending arms 28 which are apertured as indicated at 68 for the reception of the pins 30 previously described.

The portions of the bracket directly above the lower tubular portion 60 include laterally flared chambers 70 provided for the reception of the balls or detents 34. Tabs indicated at 36 are struck out of the bracket and bent to overlie the upper open ends of the compression springs 38. As best illustrated in Figure 6, two such ball receiving chambers 70 are provided. In order to provide room for the inward bending of the tabs 36 within the confines of the upwardly extending arms 28, openings indicated at 74 are cut out to surround the tabs.

Referring now to Figures 9–11 it will be observed that the ball receiving pockets 70 are of changing cross-section. This is accomplished by forming a side wall 76 thereof at an angle as best illustrated in Figure 9, so that the cross-section illustrated in Figure 10 is elongated in a direction transverse to the axis of the passage 62. This provides for proper seating of a ball in a ball receiving pocket throughout a limited range of angular adjustment of the handle or pull rod. Adjacent its upper edge, as indicated by the sectional view illustrated in Figure 11, the ball receiving pocket is generally cylindrical throughout its major extent. In a specific case where the bracket is designed for use with balls having a diameter of .250 inch, the inner surfaces of the chamber, as illustrated in Figure 10, may have a radius slightly larger than .125 inch but the centers of the radius at opposite sides of the chamber are displaced as for example about 1/16 inch.

When the brake is applied the operation of the brake mechanism applies a pull to the pull rod tending to move it axially in the rod receiving passage through the bracket. At the same time the spring 14 applies a force tending to rotate the rod in a clockwise direction as viewed from the handle end. Accordingly, the direction for releasing the lever is counterclockwise rotation as viewed from the handle end. It has been found that due to variations in installation it has in the past sometimes occurred that the handle was inadvertently released by a clockwise bumping of the handle with the knee or hand. In order to overcome this objection, the bracket is specifically modified by the provision of a recess indicated at 80, best illustrated in Figures 12–15. This recess is at the right hand side of the ball chamber corner. As soon as the handle is turned clockwise the ball revolves into this recess and absolutely stops rotation. In other words, it is impossible to turn the handle more than a few degrees before the clockwise rotation is absolutely blocked.

As best seen in Figures 12–15, the recess 80 is located substantially at the juncture between the longitudinal passage 62 and the chambers 70. More specifically, the recesses 80 are provided at the side of the chambers 70 toward which the rod is urged by the action of the brake mechanism and toward the side of the chambers toward which the adjacent portions of the rod move under the influence of the spring 14. Another way of defining the location of the recesses 80 is to specify that they occupy the quadrant between a plane radial of the passage 62 and passing longitudinally through the chambers 70, and a second plane perpendicular to the first and perpendicular to the axis of the passage 62 and extending longitudinally through the particular chamber 70. The first of these planes may be considered as illustrated by the vertical line 82 in Figure 14, and the second of these planes may be considered as illustrated by the vertical lines 84 or 86 in Figure 12.

From an inspection of these figures it will be observed that the recess 80 is provided with a ball engaging surface or shoulder facing downwardly toward the passage 62. The inner surface of the recess 80 is generally spherical having a radius approximately equal to that of the ball detent associated therewith.

It will be appreciated that when the brake handle is pulled to apply the brake and released with a ball partly received in an indentation 40 in the pull rod, the ball will also seat itself in the recess 80, with the result that the ball will be engaged throughout a very substantial angular extent and so that rotation of the handle in a clockwise direction will not cam the ball outwardly from the indentation in the pull rod. At the same time, counterclockwise rotation of the pull rod in the usual manner will cam the engaged ball outwardly of the indentation in the pull rod and out of surface engagement with the recess, thereby releasing the pull rod to permit its axial movement in brake releasing direction.

The drawings and the foregoing specification constitute a description of the improved hand brake pull rod assembly in such full, clear, concise and exact terms as to enable any person skilled in the art to practice the invention, the scope of which is indicated by the appended claims.

What I claim as my invention is:

1. A bracket for a hand brake pull rod comprising a rod guide portion having a generally cylindrical passage therethrough adapted to receive a pull rod for axial and angular movement therein, said bracket having ball housing portions extending laterally from said rod guide portions, said ball housing portions having elongated ball receiving chambers communicating with said passage and adapted to receive balls engageable with indentations formed in the pull rod, said chambers being provided with laterally extending ball receiving recesses located at the juncture between said chambers and said passage, said recesses having ball engaging shoulders facing toward said passage effective to prevent movement of balls engaged therein outwardly in said chambers from said passage.

2. A bracket as defined in claim 1 in which said recesses are located in their entirety at one side of a plane radial of said passage and extending longitudinally of said chambers.

3. A bracket as defined in claim 1 in which each of said recesses is located in its entirety in the quadrant defined by the intersection of a first plane radial of said passage and extending longitudinally of its chamber and a second plane perpendicular to said first plane and extending longitudinally of its chamber.

4. A bracket as defined in claim 3 in which said bracket is formed of sheet metal doubled for forming said passage.

5. A bracket as defined in claim 4 in which said recesses are coined.

6. A bracket as defined in claim 4, said bracket including integral mounting wings extending outwardly from said passage.

7. A bracket as defined in claim 4, said bracket including integral tabs extending over the ends of said chambers remote from said passage.

8. A bracket as defined in claim 6, said bracket including integral tabs extending over the ends of said chambers remote from said passage.

9. A bracket as defined in claim 8 in which said wings are provided with enlarged openings partly surrounding at least some of said tabs to provide access to said tabs for bending them into position overlying the ends of the chambers associated therewith.

10. A hand brake assembly comprising a bracket having a rod guide passage and elongated ball receiving chambers extending laterally from said passage, a brake pull rod in said passage, resilient means connected to said rod and biasing said rod for angular movement in said passage, the brake means actuated by said pull rod including means biasing said rod axially toward release position, longitudinally aligned ball receiving indents in said rod, balls in said chambers, resilient means in said chambers biasing said balls toward said rod, said indents having one side thereof inclined to form cam surfaces effective to cam said balls outwardly in said chambers upon angular movement of said rod, said chambers having ball engaging recesses located at the intersection between said chambers and said passage, said recesses extending laterally from said chambers and providing ball engaging surfaces facing toward said passage and effective to prevent movement of said balls outwardly in said chambers when engaged by said surfaces.

11. A brake assembly as defined in claim 10 in which said recesses are located at the side of said chambers toward which the brake means urges said rod.

12. A brake assembly as defined in claim 10 in which said recesses are located at the side of said chambers toward which said resilient means tends to turn the indents in said rod.

13. A brake assembly as defined in claim 11, in which said recesses are located at the side of said chambers toward which said resilient means tends to turn the indents in said rod.

14. A brake assembly as defined in claim 13 in which said recesses are entirely within the quadrant defined between intersecting planes one of which is radial of said passage and extends longitudinally of said chambers and the other of which is perpendicular to the axis of said passage and extends longitudinally of said chambers.

References Cited in the file of this patent

UNITED STATES PATENTS

| | | |
|---|---|---|
| 651,706 | Forbes | June 12, 1900 |
| 2,522,540 | Sandberg | Sept. 19, 1950 |
| 2,621,537 | Powell | Dec. 16, 1952 |